: US 9,051,988 B2
(45) Date of Patent: Jun. 9, 2015

(54) SHOCK ABSORBER AND METHOD FOR OPERATING A SHOCK ABSORBER IN PARTICULAR FOR A BICYCLE

(71) Applicant: DT SWISS, INC., Grand Junction, CO (US)

(72) Inventors: Stefan Battlogg, St. Anton (AT); Martin Walthert, Aarberg (CH); Gernot Elsensohn, St. Anton (AT); Juergen Poesel, Bludenz (AT)

(73) Assignee: DT Swiss Inc., Grand Junction, CO (US)

( * ) Notice: Subject to any disclaimer, the term of this patent is extended or adjusted under 35 U.S.C. 154(b) by 0 days.

(21) Appl. No.: 13/927,874

(22) Filed: Jun. 26, 2013

(65) Prior Publication Data

US 2013/0341138 A1 Dec. 26, 2013

(30) Foreign Application Priority Data

Jun. 26, 2012 (DE) .......................... 10 2012 012 532

(51) Int. Cl.
*F16F 9/53* (2006.01)
*B62K 25/04* (2006.01)

(52) U.S. Cl.
CPC . *F16F 9/535* (2013.01); *F16F 9/53* (2013.01); *B62K 2025/044* (2013.01)

(58) Field of Classification Search
CPC ............. F16F 9/46; F16F 9/463; F16F 9/466; F16F 9/469; F16F 9/3292; F16F 9/535; F16F 9/532; F16F 2222/06; F16F 2224/043; F16F 2224/045

USPC ......... 188/267.1, 267.2, 266.1, 266.2; 701/37
See application file for complete search history.

(56) References Cited

U.S. PATENT DOCUMENTS 4,949,573 A * 8/1990 Wolfe et al. .................... 188/267
5,276,623 A * 1/1994 Wolfe ............................. 701/37
(Continued)

FOREIGN PATENT DOCUMENTS

DE  102006014833 A1  11/2006
DE   60320456 T2    6/2009

OTHER PUBLICATIONS

German Patent and Trademark Office Search Report Dated Feb. 27, 2013.

*Primary Examiner* — Thomas J Williams
(74) *Attorney, Agent, or Firm* — Laurence A. Greenberg; Werner H. Stemer; Ralph E. Locher (57) ABSTRACT

Shock absorber and method for operating a shock absorber for a bicycle wherein a relative motion of a first and a second component interconnected via a damper device is dampened. The damper device includes a controllable damping valve having at least one field generating device with which a field-sensitive medium can be influenced by applying a field intensity of the field generating device. A parameter for the current speeds of the first and second components relative to one another is obtained in real time. For damping, a current field intensity to be set is derived in real time by way of the parameter from a characteristic damper curve and by the field generating device the field intensity to be currently set is generated in real time for setting in real time a damping force which results from the predetermined characteristic damper curve at the parameter obtained.

7 Claims, 6 Drawing Sheets

(56) References Cited

U.S. PATENT DOCUMENTS

| | | | |
|---|---|---|---|
| 6,049,746 A * | 4/2000 | Southward et al. | 701/37 |
| 6,952,637 B2 * | 10/2005 | Barron et al. | 701/48 |
| 7,885,740 B2 | 2/2011 | Izawa et al. | |
| 7,942,248 B2 * | 5/2011 | St. Clair et al. | 188/267.2 |
| 8,151,952 B2 * | 4/2012 | Nieder-Vahrenholz et al. | 188/266.2 |
| 8,770,357 B2 * | 7/2014 | Sims et al. | 188/267.2 |
| 2005/0113997 A1 * | 5/2005 | Kim | 701/37 |
| 2011/0017555 A1 * | 1/2011 | Battlogg et al. | 188/267.2 |
| 2011/0127706 A1 * | 6/2011 | Sims et al. | 188/267.2 |
| 2012/0085606 A1 * | 4/2012 | Walthert et al. | 188/267.2 |

* cited by examiner

SHOCK ABSORBER AND METHOD FOR OPERATING A SHOCK ABSORBER IN PARTICULAR FOR A BICYCLE

CROSS-REFERENCE TO RELATED APPLICATION

This application claims the priority, under 35 U.S.C. §119, of German application DE 10 2012 012 532.1, filed Jun. 26, 2012; the prior application is herewith incorporated by reference in its entirety.

BACKGROUND OF THE INVENTION

Field of the Invention

The present invention relates to a shock absorber for an at least partially muscle-powered vehicle and in particular a bicycle. The bicycle may be equipped with an auxiliary drive and in particular an electric auxiliary drive.

Many different types of rear wheel dampers and suspension forks for bicycles have become known in the prior art. A shock absorber typically comprises a spring unit for cushioning any shocks occurring and a damping unit for damping the spring vibration. In the case of rear wheel shock absorbers the spring unit and the damping unit are as a rule configured as an integral unit. In the case of suspension forks the damping unit and the spring unit may be disposed separately.

Most dampers for bicycles are operated with oil as the damping fluid. For damping, the damping fluid is conveyed from a first damping chamber to a second damping chamber through a valve gate throttling the flow. The size of the valve gate aperture determines the damping strength. An optimal damping is dependent on a number of factors such as for example the rider's weight and in particular the terrain characteristics. It is desirable to set the damping strength in relation to loads such that weak shocks are dampened less than heavy shocks. For rides on a road, a forest path, or directly off-road, different damping settings are therefore optimal.

For adjusting and influencing damping, magneto-rheological and electro-rheological fluids have become known whose characteristics can be influenced by way of applying a suitable magnetic or electric field.

Most magneto-rheological fluids consist of a suspension of small particles that polarize magnetically and which are finely dispersed in a carrier liquid such as oil. The polarizing particles which tend to consist of a carbonyl ferrous powder have typical diameters between approximately 0.1 and 50 micrometers, under the influence of a magnetic field forming chain-like structures capable of absorbing field-dependent shear stresses. This allows to change for example the flow resistance of a valve in a way similar to viscosity changes. The process is fast and reversible such that the initial rheologic state will be reinstated as the magnetic field is broken. Thus, magneto-rheological fluids are suitable to be used in dampers of bicycles.

With DE 698 21 799 T2 a rear wheel shock absorber for bicycles has become known which is dampened by means of a magneto-rheological fluid. One end of a damper chamber is provided, via a bore, with an outwardly connection to an external damping valve which is connected with an external unit disposed in parallel in which the second damper chamber is accommodated. The damping valve is provided with a permanent magnet whose position relative to the flow gap can be changed for adjusting the magnetic field strength in the flow gap. The disadvantage of such a system is the complex structure requiring a damper chamber disposed separately and in parallel which increases the construction and the mounting steps and the weight of the rear wheel shock absorber.

A general drawback of shock absorbers operating with electro-rheological or magneto-rheological fluids is that the damping of shocks requires to first overcome a breakaway force before a flow through the magneto-rheological damper valve occurs. The reason for this is for example the comparatively stable interlinking between the magneto-rheological particles along the field lines. Flow through a damping duct is possible only as the breakaway force is overcome. Known magneto-rheological dampers provide for setting a specific, adjustable damping force. The drawback of this is, however, poor responsivity since the shock absorber will not respond before the breakaway force has been overcome. With a soft shock absorber setting the breakaway force is overcome relatively fast and with a hard shock absorber setting the breakaway force is only overcome with large forces. In both cases, however, the shock absorber will not respond until the respective breakaway force is overcome.

EP 2 278 185 A1 discloses a magneto-rheological rear wheel shock absorber for a bicycle in which the strength of the magnetic field acting in the damping duct is set mechanically through a rotary ring. Damping can be adjusted both in the compression stage and in the rebound stage. The shock absorber offers agreeable responsivity since an adjustable portion of the damping duct exposed to the magnetic field ensures a zero passage in the force-velocity diagram. Another advantage of such a system is that operation does not require any electric energy. Flexible or electronic adjustment of changes to the damper characteristics is difficult though.

WO 2010/007433 A2 discloses a shock absorber for bicycles in which damping in the compression stage is influenced by a magneto-rheological valve. An acceleration sensor detects the acceleration value at predetermined time intervals, activating the electric coil for damping the flow through the damping valve if an acceleration value exceeds a predetermined threshold. This shock absorber and the method performed therewith cause the damping of shocks and in what is called sway pedal stroke it prohibits the seesawing motion called "pedal bob" due to the periodic damper compressions. Furthermore the known damper allows to capture the acceleration values for specific periods to automatically determine the type of the terrain in which the cyclist rides. The quantity and magnitude of the acceleration values for example allows to determine whether the rider travels on smooth tarmac or else through rough terrain. The damping can be adapted according to the history data so as to set a hard damping on a smooth road while soft damping is preferred in rough terrain.

Such a damper is basically functional. There is, however, the disadvantage that for riding on a smooth road the damping is set hard such that when crossing potholes or the like there is virtually no damping and the impact is passed on virtually undampened. Although in sway pedal strokes the shock absorber prevents the damper from periodically bobbing, shocks will not be dampened either. A zero passage of the force-velocity diagram is also absent with the damping activated since the breakaway force of the MRF particles must first be overcome before any damping occurs. Another drawback is that rides on roads consume much electric energy for setting the hard damping required. This has adverse effects on the operational range, or larger batteries or accumulators must be employed which increases the weight. An increase of weight is, however, not desired.

Some ideas have also been disclosed of employing GPS sensors or the like to set electrically controlled shock absorbers dependent on their positions. A GPS signal allows to set the shock absorber for example to the "road" setting and thus hard while the damper will be set softer for rides through rough terrain. The drawback of these systems is, however, that, the comparably high accuracy of GPS signals notwithstanding, specifically on farm ways, forest or walking paths it may make a considerable difference whether the bicycle travels farther to the right or the left by 50 cm or only 10 cm or even all of 1 cm. Therefore, notwithstanding satellite-based positioning and suitable maps uploaded, the shock absorber settings may be unsuitable.

Some consideration has been given to recording the loads acting on a shock absorber for example when riding laps and setting the shock absorber for riding the next lap according to the previously recorded values so as to provide favorable damping properties. The drawback of this is once again that the second lap will not involve precisely the same way as does the first lap. A deviation of just one or a few centimeters may make a difference as to whether one rides over or around a root. Moreover, minor lateral deviations may already suffice for causing considerable changes in the ground such that even when data of previously traveled laps are accessed, considerable deviations from the actual loads acting on the shock absorber may be present.

Basically, optical recognition systems for example for motor vehicles have recently been disclosed by way of which near field recognition of the ground in front of the vehicle can be done. To this end, laser diodes or the like capture by radar the terrain in front of the vehicle and the terrain in front of the vehicle is virtually captured three-dimensionally. This works for example for vehicles in early curve recognition where accordingly the different vehicle shock absorbers are preset differently so as to obtain optimal riding conditions in the curve. It may remain open whether these kinds of systems might already today be conceivable to be employed on a bicycle and for recognizing the ground in downhill rides, since at any rate this kind of recognition requires quite considerable computing capacity and computing time. In fact, these kinds of ground recognition systems only ever allow to achieve digital shifting. The damper is either set hard or else soft by the magnetic field. When a magnetic field is acting, the shock absorber does no longer have a zero passage in the force-velocity diagram such that responsivity is poorer. Although applying a highly inhomogeneous magnetic field to the damping duct as in EP 2 278 185 A1 may provide agreeable responsivity, achieving variations of these inhomogeneous magnetic fields is not simple.

In the case of conventional shock absorbers, however, a zero passage in the force-velocity diagram is also present when the shock absorber shows a harder basic setting, which will always result in agreeable responsivity. Only activating a lockout mode will block a conventional shock absorber but in this way the shock absorber is virtually intentionally deactivated.

BRIEF SUMMARY OF THE INVENTION

It is therefore the object of the present invention to provide a shock absorber and a method for operating a shock absorber by means of which to allow flexible control and by means of which soft responsivity is enabled with different loads.

This object is solved by a method for operating a shock absorber having the features of claim 1 and by a shock absorber for an at least partially muscle-powered bicycle having the features of claim 21. Preferred specific embodiments of the invention are the subjects of the subclaims.

Further advantages and features of the invention can be taken from the general description and the description of the exemplary embodiment.

The method according to the invention serves for operating at least one shock absorber for an at least partially muscle-powered vehicle and in particular a bicycle wherein at least a relative motion of first and second components interconnected via a damper device is dampened. The damper device comprises at least one controllable damping valve with at least one field generating device and in particular an electric coil device with which to act on a field-sensitive medium for acting on a damping force of the damping device by generating a field intensity of the field generating device and in particular by generating a field intensity by applying an electric current intensity to at least one electric coil device. In particular for event recognition at least one parameter for the current relative speeds of the first and second components to one another are periodically obtained in real time. By means of the parameter a measure for a field intensity to be set for damping is derived in real time from a characteristic damper curve. The field generating device serves to generate in real time the field intensity to be currently set for setting in real time a damping force which results from the predetermined characteristic damper curve at the parameter obtained.

In this document, "current" standing alone is understood to mean "present" or "presently" whereas "electric current" is being used for "electric energy".

The method according to the invention has many advantages. A considerable advantage of the method according to the invention consists in that at least one parameter for a current relative speed of the first and second components to one another is obtained. By means of a characteristic damper curve a field intensity to be currently set is derived and set such that the damping force associated with the relative speed is on the whole adjusted in real time at the damper device. The term "in real time" means that the entire system fulfills the real-time requirements occurring. It follows that the system is sufficiently fast in capturing and evaluating data and sufficiently fast in forwarding a suitable field intensity to the field generating unit and thus force changes occur fast enough for adequate response to the respective event.

In this the current relative speed is determined and not for example an average value over one minute or more for performing automatic terrain recognition. Presently a parameter for the current relative speed at the time is obtained. The path of the relative speed over time is sufficiently highly resolved during one single shock so as to provide adequate damping force at every point in time of the shock.

A considerable advantage over the prior art is the fact that with the invention any occurring event such as a shock or seesawing motion or any other disturbance or the like is recognized, and response takes place, in real time.

This means that in normal state without any events of e.g. disturbances, there is for example no field applied to the field generating device since in the absence of disturbances there is also an absence of relative speed between the first and second components. From this it immediately follows that electric energy will be required for operating the damping valve at the most in the case of events in the form of shocks or vibrations or the like.

Quite specifically this means that for example in riding in sway pedal stroke a field will only be applied in those brief points in time where there is relative motion such that the coil as the field generating device may remain currentless at least ca. 50% of the time which allows considerable saving of electric energy. The low feed of electric energy also reduces the heat input.

In rides through rough terrain the coil will also be energized only if a corresponding current relative speed is present. In fact, damping does not even require electric energy in every event since the damper damps shocks without requiring electricity by means of the basic damping inherent to the shock absorber. Electric energy needs to be used only when a higher damping force is required.

The characteristic damper curve stored for example in a (data) memory of the damper device defines a dependence of the damping force from the speed of the two components relative to one another. The damping force results from applying a suitable field intensity with the field generating device such that the characteristic damper curve also determines the dependence of the field intensity on the relative speed. The field intensity in turn results from the electric current intensity which is applied to the electric coil device as the field generating device. Thus the characteristic damper curve also defines the in particular non-linear conjunction between the relative speed and the electric current intensity of the coil device.

Preferably the method is carried out with a shock absorber that is dampened via a magneto-rheological fluid. Preferably at least one electric coil device is employed as the field generating device.

In another configuration of the invention the method according to the invention serves for operating at least one shock absorber for an at least partially muscle-powered vehicle and in particular a bicycle wherein at least a relative motion of first and second components interconnected via a damper device is dampened. The damper device comprises at least one controllable damping valve with at least one field generating device and in particular an electric coil device with which to act on a field-sensitive medium for acting on a damping force of the damping device by generating a field intensity of the field generating device and in particular by generating a field intensity by applying an electric current intensity to at least one electric coil device. A control device for controlling is provided. A control cycle is run through under periodical control. At least one current parameter for the current relative speed of the first and second components relative to one another is periodically obtained in the control cycle. By means of the current parameter a current electric current intensity of the field generating device is derived from a predetermined characteristic damper curve in the control cycle. Thereafter the current electric current intensity is applied on the field generating device in the control cycle. In this way a damping force is set in real time during passing the control cycle, ensuing from the predetermined characteristic damper curve at the obtained current parameter.

However, the embodiments of shock absorbers described in this application may basically be equipped with electro-rheological fluids as field-sensitive fluids. Correspondingly an electric field is applied in these shock absorbers.

A characteristic damper curve in the sense of the present application may be understood to mean a functional relationship which links the relative speed or the parameter with a damping force via a calculation rule. A characteristic damper curve is also understood to mean a map diagram which can be interrogated. Direct access to the control points provided is possible or a suitable damping force is derived from a given parameter using an interpolation or extrapolation method. Accordingly the damping force can be linked with a field intensity to be generated and the field intensity, with an electric current intensity to be set.

The first and second components may be any desired component of the shock absorber or for example of the bicycle at which the shock absorber is mounted. Thus the components may be opposite damper ends. It is also possible to understand the first and second components to be connection elements or for example the stanchion (inner) tube and the slider (outer) tube of a suspension fork.

Simply put, the method for operating a shock absorber with which a relative motion of first and second interconnected (vehicle) components is captured by way of a damper device and with which, in dependence on an obtained dimension of the current relative motion, a field generating device is set according to a predetermined characteristic damper curve or field curve.

The current speed of the relative motion between the first and second components to one another is periodically obtained and in dependence on the dimension of the current speed of the relative motion the current field of the field generating device is set corresponding to a predetermined field curve or characteristic damper curve. In simple cases, given regular or substantially regular time intervals between measurements, a parameter for the current relative speed will directly result from the captured relative motion.

Unlike the prior art a characteristic damper curve is not mechanically specified but the characteristic damper curve is dynamically generated. A specified characteristic damper curve is retraced at any time as needed by way of setting the corresponding field intensities or electric current intensities. This means that firstly, a characteristic damper curve is specified or selected. Thereafter the damping force pertaining to every relative speed occurring is obtained and also set by way of setting a corresponding electric current intensity. This happens fast enough for the system to operate in real time. Response to any and all events and shocks occurring is fast enough for the shock absorber to behave as if the specified characteristic damper curve in the shock absorber is realized mechanically. The difference to a purely mechanically structured shock absorber consists in the option to specify and select any characteristic damper curve desired. Mechanical modifications to the shock absorber settings are not necessary. It is even possible to set two successive characteristic damper curves the realization of which would not be possible in conventional, purely mechanically adjusted shock absorbers for example if they involve incompatible mechanical properties. In this way enormous flexibility is achieved.

It is particularly preferred for the damping force to be increased with increasing relative speed. It is also particularly preferred for the damping force to increase with increasing field intensity and in particular with increasing electric current intensity of the field generating device. Such a configuration allows a particularly energy-saving operation since a field from the field generating device is required only when a suitable damping force is needed. In normal state, with no relative motion between the first and second components, field intensity and thus electric energy is consequently not needed. This allows energy-saving operation for example in rides on a smooth road at a high pedaling frequency since these conditions will as a rule not involve any or hardly any shocks on the shock absorber. Seesawing motions will also not at all or hardly occur with a high pedaling frequency.

Particularly preferably the characteristic damper curve, in the region of low positive and/or negative relative speeds, shows a path which can be approximated or described by a straight line with a predetermined low-speed gradient. Particularly preferably the characteristic damper curve is substantially configured linearly in the region of low positive and/or negative relative speeds. The gradients in the regions of the positive and negative relative speeds may differ.

It is also particularly preferred for the characteristic damper curve to be approximated or described by a straight line with a predetermined high-speed gradient in the region of high positive and/or negative relative speeds. Preferably the characteristic damper curve is at least substantially linear in the region of high relative speeds. Again the gradients for the rebound and compression stages may differ.

In medium regions of positive and/or negative relative speeds at least one linear or curved transition region may be provided in which a non-linear path of the damping force or field intensity over the relative speed is provided.

In any case the characteristic damper curve serves as the basis for controlling the shock absorber. After capturing a parameter or the current relative speed itself the parameter or the corresponding current speed obtains, by means of the provided characteristic damper curve, a pertaining damping force and thus a pertaining current field intensity and in particular electric current intensity which is then adjusted such that the flow resistance of the damping valve is adapted in real time. In this way it is allowed to specify, choose, or adjust, a great variety of characteristic damper curves which the damper device then automatically holds. This allows automatic mode in which the rider basically does not need to make any settings.

It is also a particular advantage of the method that agreeable responsivity is provided since in normal state absent any disturbances no field or only a particularly weak field of the field generating device is applied. Thus no breakaway force or only a very low breakaway force is required for triggering damping. The damper device is supplied with electric current only in the case of actual shocks. In shock- and vibration-free normal state the damper valve does not require any electric current. In this way very soft responsivity is obtained which the user perceives as agreeable.

Specifying a characteristic damper curve also allows to set a smooth transition from the low-speed range to the high-speed range.

In all the configurations it is particularly preferred to reduce the field intensity of the field generating device as soon as the obtained, current relative speed is lower than the immediately preceding relative speed. Unlike prior art shock absorbers the shock absorber according to the invention is not primarily controlled by way of ground recognition but the current state is recognized in real time and suitable damping is set in dependence on an obtained disturbance (of the basic state). Therefore the method according to the invention substantially automatically suppresses for example the seesawing motion in sway pedal stroke.

Adjustment or in particular automatic selection of a characteristic damper curve from multiple different characteristic damper curves is possible and preferred. This allows to specify different characteristic damper curves for example for various grounds to thus enable still softer or harder responsivity and the like. It is also possible to store data and to automatically adapt the characteristic damper curve to the riding properties by way of stored parameters and the like. However, this does not change the fact that with every single shock the damping force of the shock absorber will still be controlled in real time.

Preferably the parameter is determined by way of at least one set of parameters having at least one parameter, wherein at least one parameter is obtained from a group of parameters including, time data, time differences, position data, relative positions, absolute positions, relative speeds, absolute speeds, accelerations, relative accelerations, and the like, of at least the first and/or second components. Particularly preferably the parameter for the relative speed is obtained from the set of parameters.

In all the configurations it is preferred for the characteristic damper curve to substantially run through the origin of coordinates. Particularly preferably the characteristic damper curve runs precisely through the origin. Or else it is also possible that is runs quite close to the origin. In the sense of this application, "substantially through the origin" is also understood to include deviations lying within 5% of the designed maximum values. For particularly soft responsivity a damping force close to zero is advantageous given a relative speed of zero. It is preferred for the characteristic damper curve in the operating state with the rider sitting on the bicycle to show, at zero speed, a force less than 100 N and in particular less than 50 N.

In all the configurations the time interval between two successive instances of obtaining (what is the current) parameter is less than 30 and in particular less than 20 ms. In particular is the time interval less than 10 ms, preferably less than 5 ms or even less than 3 ms or 2 ms. Short time intervals allow to very quickly capture any disturbances occurring.

Particularly preferably the regulating speed is faster than 50 ms and in particular faster than 40 ms. Preferably the regulating speed is less than 30 and particularly preferably less than 20 ms. Particularly preferably a regulating speed of less than 10 ms is achieved. The regulating speed is presently understood to mean the period of time that passes for capturing by the sensor, evaluating the sensor signals, and setting the field and building up the damping force. In particular is regulating speed understood to mean the time duration of one entire cycle of the control cycle.

Regulating speeds for example of 30, or 20 or 10 ms, have shown to be sufficiently fast in the field of bicycles. Using rheological fluids and in particular magneto-rheological or else electro-rheological fluids allows to achieve response times in the fluid of clearly less than 10 ms. The shock absorber allows to keep the response times and regulating speeds even under full load. These response speeds are not possible at affordable efforts for items fit for series production with conventional, mechanical valves. Known conventional bicycle dampers show response times of 250 ms or more. Moreover, changes to the flow resistance under full load require considerable energy in conventional valves. Unlike in conventional valves, a magneto-rheological damping valve does not involve reducing or enlarging a valve gap. The magneto-rheological damping valve only requires application of a magnetic field with the energy used for generating the field independent of the flow rate of the medium in the damping valve.

In all the cases less than 20 ms and in particular less than 10 ms and preferably less than 5 ms may pass between the relative motion of the two components and the adapted damper force resulting therefrom.

In all the configurations it is also possible to obtain through the sensor data or other data such as GPS sensors or the like, a parameter for the surface-/ground-/roadway quality and, in dependence on the ground conditions, to choose one of for example multiple predetermined characteristic damper curves.

It is also possible to employ anticipatory models wherein the most recent measurement values are analyzed and for example a curve is drawn through the control points to obtain forecasts for the subsequent measurement values.

It is also particularly preferred for the characteristic damper curve to be made steeper in the vicinity of an end position of the damper device to ensure a softer limit stop. In particular in the case of capturing position data the vicinity of an end position can be readily determined. An augmentation of the field by means of the field generating device allows to set a higher end position damping.

It is also possible for the characteristic damper curve to be varied by mechanical or hydraulic means in the vicinity of an end position.

The shock absorber according to the invention is provided for an at least partially muscle-powered bicycle, comprising at least one damper device disposed between first and second components for damping relative motion. At least one control device and at least one memory device and at least one sensor device are provided also. The damper device comprises at least one controlled damping valve with at least one field generating device that is in particular configured as an electric coil device. A field of the field generating device can act on a field-sensitive medium for influencing a damping force of the damper device by generating a field intensity of the field generating device. The control device and the sensor device are configured to periodically obtain in real time at least one parameter for current relative speeds of the first and second components relative to one another. The control device is configured to derive in real time a current field intensity to be generated by means of the parameter from a characteristic damper curve stored in the memory device. The control device and the field generating device are configured so as to set in real time the field intensity to be currently generated for setting in real time a damping force resulting from the predetermined characteristic damper curve at the parameter obtained.

The shock absorber according to the invention also has many advantages since it enables flexible control. At the same time, energy-saving operation is enabled in which at all times the lowest possible but the highest necessary field is applied on the damping valve. When employing an electric coil device as the field generating device the electric current intensity can be kept the smallest possible at all times.

The measure of a current field intensity to be generated may for example be the electric current intensity or the voltage which is imposed on a field generating device for at least approximately generating the desired current field intensity to be generated.

The parameter may be used for event recognition.

In another configuration of the invention the shock absorber according to the invention is provided for an at least partially muscle-powered bicycle, comprising at least one damper device disposed between a first and a second component for damping a relative motion. At least one control device and at least one memory device and at least one sensor device are provided also. The damper device comprises at least one controlled damping valve with at least one field generating device that is in particular configured as an electric coil device. A field of the field generating device can act on a field-sensitive medium for influencing a damping force of the damper device by generating a field intensity of the field generating device. The control device is equipped and configured for periodically controlling a control cycle. The control device and the sensor device are configured to periodically obtain in real time at least one parameter for current relative speeds of the first and second components relative to one another. The control device is configured to derive in real time a current electric current intensity to be set by means of the parameter from a characteristic damper curve stored in the memory device. The control device and the field generating device are configured to set in real time the electric current intensity to be currently set for setting in real time within the control cycle a damping force resulting from the predetermined characteristic damper curve at the parameter obtained.

Particularly preferably the damper device comprises a basic curve that is predetermined by the mechanical configuration and by mechanical valves. Preferably the basic curve shows a gradient of the damping force that in negative relative speeds, thus in rebound, is steeper than is the gradient of the damping force in positive relative speeds. Thus the basic curve already allows a higher rebound damping.

In particular at least one mechanical valve is configured as a mechanical one-way valve. It is possible for two different mechanical valves to be connected in parallel.

Preferably at least one mechanical valve and at least one damping duct, on which a field of the field generating device can be applied, are connected in series. In all the configurations a maximum flow cross-section in the compression stage is preferably different from a maximum flow cross-section in the rebound stage. The maximum flow cross-section in the compression stage and/or in the rebound stage may be limited through at least one mechanical one-way valve.

In all the configurations the control device captures, preferably at predefined fixed or variable time intervals, the sensor signal, deriving therefrom, by comparison against a characteristic damper curve or control curve stored in a memory device, a control signal, thus controlling the field generating device so as to adjust the flow resistance by way of the damping valve according to the stored characteristic damper curve.

When capturing the parameters at known time intervals the current relative motion itself may be used as a magnitude and thus as a parameter for the current relative speed. Or else the current relative speed may be computed by dividing the current relative motion by the time interval. It is also possible to count pulses representing a specific relative motion each. The number of pulses per unit time then likewise defines a relative speed and thus a parameter.

In another advantageous configuration the vehicle may for example be lowered during riding. For example the suspension fork may be lowered or the rear wheel shock absorber and/or the seat post can be intentionally compressed. Such lowering is preferably not done immediately but dynamically, i.e. in dependence on the damper motion or the damper stroke. The rebound stage of the damper is locked within an extremely short time or at least full rebound is prohibited, in a desired position (stroke position) resulting from the compressing damper motion e.g. in braking or riding through curves. For faster or further lowering the compression stage can at the proper time be briefly set soft or softer and then in motion reversal the rebound stage can quickly be set hard or harder.

In compressing the compression stage must then (in particular quickly) be set softer so as to retain agreeable compressing.

In the same way the near field recognition system is conceivable in combination with the previously described shock absorber that switches in real time for reducing the total time (recognition till force change at the damper) e.g. in bicycles.

The same applies to speech recognition systems. Speech recognition requires comparatively long computing times. Only in combination with a fast total system downstream of the speech recognition system (electronics, actor with field-sensitive, rheological medium) can results be achieved that are good for the user. Speech recognition is also conceivable by means of a mobile telephone or the like in communication with the operating unit or the control unit.

In preferred embodiments the field generating device of the shock absorber, absent any event or relative motion of the first and second components relative to one another, is substantially currentless or even entirely currentless. In particular will electric energy not be required for damping until an event occurs or relative motion of the first and second components to one another occurs. An event is the occurring of a relative motion of the first and the second components relative to one another. "Substantially currentless" in the sense of the present application is understood to mean a state in which the field generating device needs less than 10% and in particular less than 5% and preferably less than 1% and particularly preferably less than 0.5% of the maximum electric current intensity. "Entirely currentless" is understood to mean a stage in which the field generating device requires absolutely no electric current or in which only minor electric current intensities in the region of less than 10 mA and in particular less than 1 mA and preferably less than 500 µA are required.

Other features which are considered as characteristic for the invention are set forth in the appended claims.

Although the invention is illustrated and described herein as embodied in a shock absorber and method for operating a shock absorber in particular for a bicycle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE INVENTION

With reference to the enclosed figures an exemplary embodiment of a bicycle 200 equipped with shock absorbers 100 will be discussed below.

Figure 1:
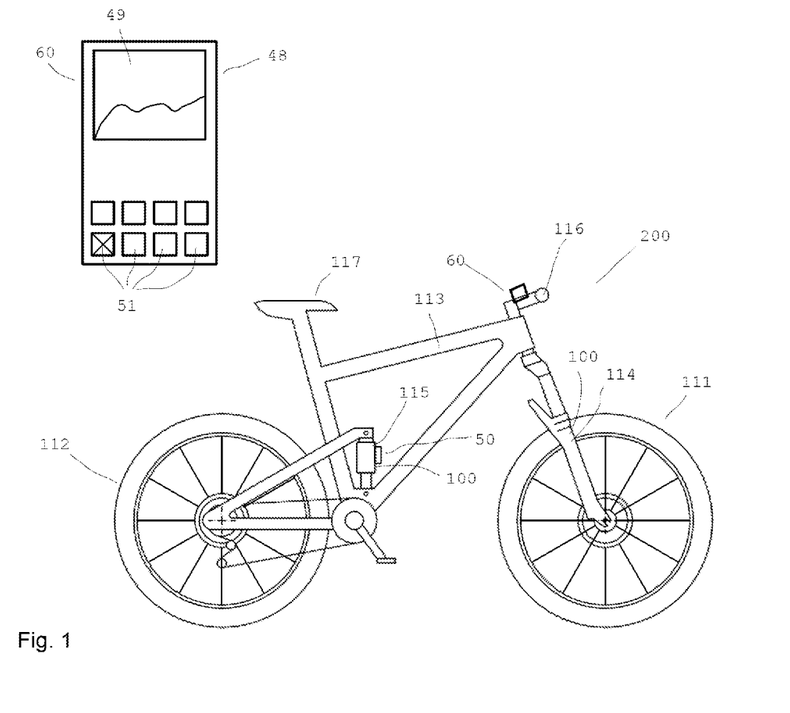
FIG. 1 a schematic view of a bicycle equipped with a shock absorber according to the invention.

FIG. 1 shows a schematic illustration of a bicycle 200 configured as a mountain bike and comprising a frame 113 and a front wheel 111 and a rear wheel 112. Both the front wheel 111 and the rear wheel 112 are equipped with spokes and may be provided with disk brakes. A gear shifting system serves to select the transmission ratio. Furthermore the bicycle 200 comprises a handlebar 116 and a saddle 117.

The front wheel 111 is provided with a shock absorber 100 configured as a suspension fork 114 and the rear wheel is provided with a shock absorber 100 configured as a rear wheel damper 115. A central control device 60 is presently provided at the handlebar 116.

The central control device 60 may be employed as a suspension system, controlling both the suspension fork 114 and the rear wheel damper 115 in synchrony. Control of the shock absorbers 100 and further bicycle components may be provided in dependence on many different parameters and is also done by way of sensor data. Optionally the suspension and/or damping characteristics of the seat post can be adjusted. It is possible to also control by way of the central control device 60 the shifting system for adjusting different transmission ratios.

Additionally each of the shock absorbers 100 comprises at least one control device 46 at an electronic unit 50 provided to be exchangeable. The electronic units 50 comprise at least one battery unit 61. The battery units 61 may be exchanged together with the respective electronic unit or separately. For example rechargeable battery units may be provided which can be quickly removed from the shock absorber together with the electronic unit 50 for recharging the electronic unit. Also possible is energy supply by a central battery unit or by assistance or operation by a dynamo or the like.

Presently a control device 46 or a control unit is incorporated in the shock absorber wherein the control unit provides the basic functions. Operation then occurs via the electronic unit 50 or via the central control device 60. By means of the control device 60 or the control devices 46 the damping properties of the suspension fork 114 and the rear wheel shock absorber 115 can be set.

The central control device 60 is operated via an operating device 48. It is possible for the control device 60 to have a display device 49 and/or multiple operating knobs 51. It is also possible for the control device to be configured touch-sensitive or proximity-sensitive so as to allow operation by way of touching dedicated buttons or the like.

The control device 60 may then also serve as a bicycle computer, displaying data such as the current speed, and the average speed and/or kilometers per day, per tour, per lap, and total. Also possible is displaying the current position, current altitude, or the route traveled or the route profile.

Figure 2:
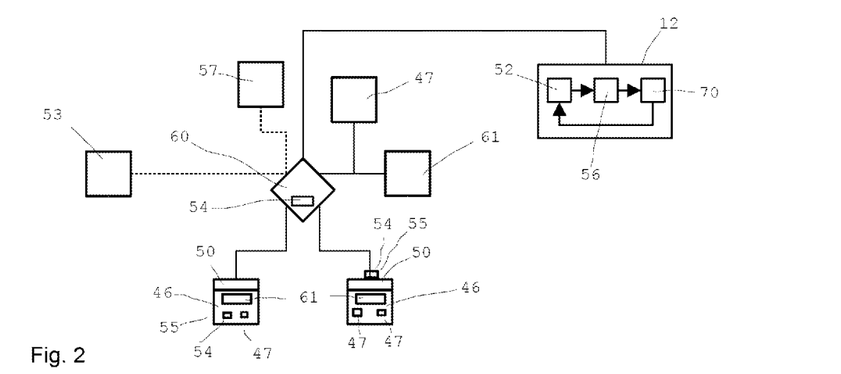
FIG. 2 a schematic view of the communication connections of the bicycle according to FIG. 1.

FIG. 2 shows a schematic illustration of the communication connections of the components involved. The central control device 60 may be connected with the individual components either wire-bound or wireless for example through WLAN, Bluetooth, ANT+, GPRS, UMTS, LTE, or other transmission standards. The connection shown in dotted lines with the internet 53 is a wireless connection. The control device 60 may be connected with the battery unit 61 or have its own energy supply. Furthermore the control device 60 may be connected with a sensor 47 or multiple sensors 47. The graphic operating unit 57 or display unit may also have a wireless connection with the control unit 60. The shock absorber 100 of the suspension fork 114 or the shock absorber 100 of the rear wheel damper 115 may be connected wireless or wire-bound. Connection occurs through a network interface 54 which may be configured as a radio network interface 55 or a cable connection 56.

In FIG. 2 the control cycle 12 is illustrated schematically which is stored in the memory device and stored or programmed in the control device 60 or the control devices 46. The control cycle 12 is periodically performed in operation and in particular continuously periodically. In step 52 e.g. the sensors 47 capture a current relative motion or current relative speed of the first component relative to the second component. In step 52 a parameter is derived from the values of the sensor 47 or the sensors that is representative of the current relative speed. Thereafter in step 56 the pertaining damping force to be set is then derived from the obtained parameter 81 (see FIGS. 10, 11) taking into account the predetermined or selected characteristic damper curve. A measure of the field intensity to be currently set is derived therefrom with which the damping force to be set is achieved at least approximately. The measure may be the field intensity itself or else indicate the electric current intensity with which the damping force to be set is obtained at least approximately. In the subsequent step 70 the field intensity to be currently set is generated or the corresponding electric current intensity is applied to the electric coil device as the field generating device such that within one single cycle of the control cycle 12 the damping force is generated which in the case of the selected or predetermined characteristic damper curve corresponds to the current relative speed of the first component to the second component. Thereafter the next cycle starts and step 52 is once again performed.

Figure 3:
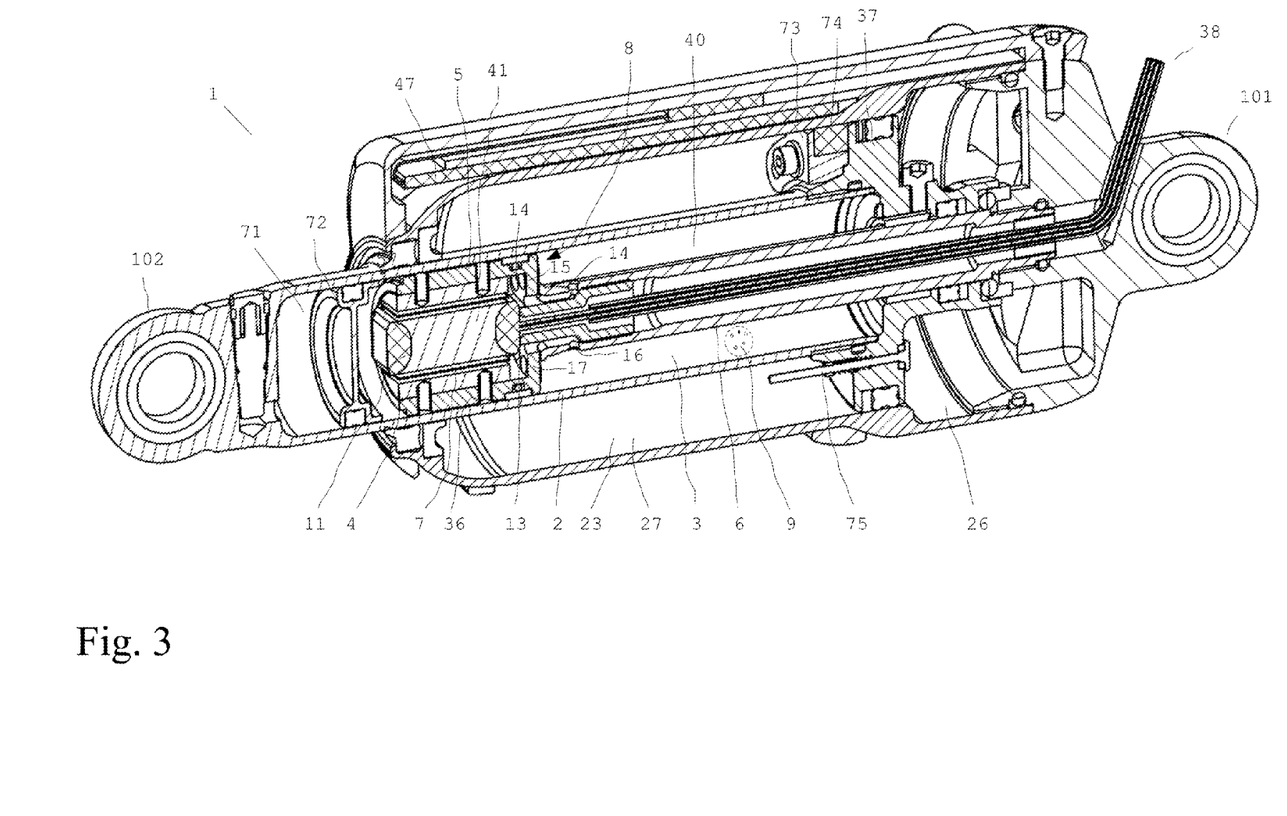
FIG. 3 a schematic sectional view of a shock absorber of the bicycle according to FIG. 1 with an electronic unit.

FIG. 3 shows a simplistic cross-sectional view of a shock absorber 100 which is presently employed for example in the rear wheel damper 115.

The shock absorber 100 comprises a damper device 1. The shock absorber 100 is fastened, with the first end as the component 101 and the second end as the component 102, to different frame parts for damping relative motions.

Figure 4:
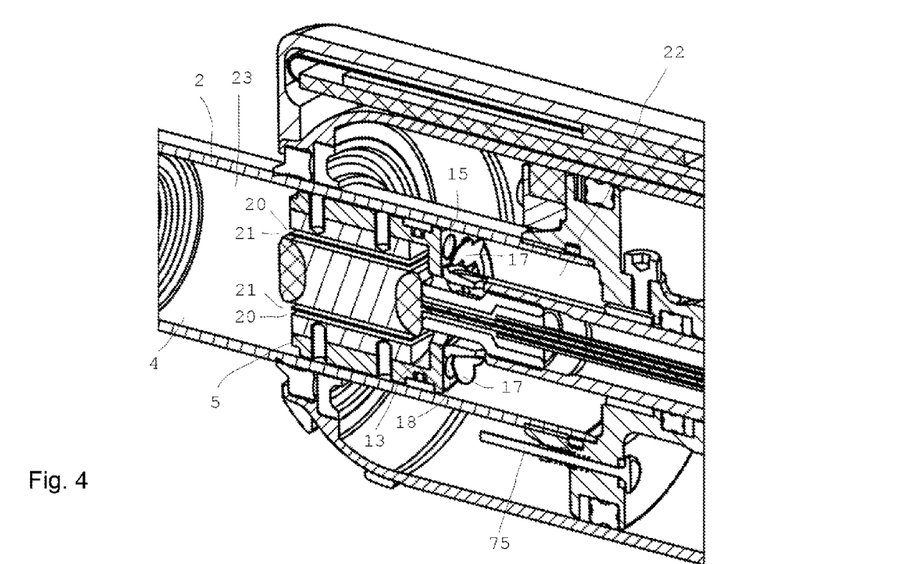
FIG. 4 a sectional side view of the shock absorber according to FIG. 3 in an enlarged illustration in the compression stage.

In the damper housing 2 a damping piston unit 40 is provided which comprises a damping piston 5 as the damping valve 8 and a piston rod 6 connected therewith. The damping piston 5 is provided with the damping valve 8 therein which presently comprises a field generating device 11 and in particular an electric coil for generating a suitable field intensity. The magnetic field lines in the central region of the core 41 run approximately perpendicular to the longitudinal extension of the piston rod 6 and thus penetrate the damping ducts 20, 21 approximately perpendicular (see FIG. 4). FIG. 4 This causes the magneto-rheological fluid present in the damping ducts 20 and 21 to be effectively influenced so as to allow effective damping of the flow through the damping valve 8. The shock absorber 100 comprises a first damper chamber 3 and a second damper chamber 4 separated from one another by the damping valve 8 configured as the piston 5. In other configurations an external damper valve 8 is possible which is disposed external of the damper housing 2 and connected via supply lines.

The first damper chamber 4 is followed toward its end 102 by the equalizing piston 72 and thereafter by the equalizing space 71. The equalizing space 71 is preferably filled with a gas and serves for equalizing the piston rod volume which in compressing enters into the whole damper housing 2.

Magneto-rheological fluid 9 as the field-sensitive medium is present not only in the damping valve 8 but in the two damping chambers 3 and 4 on the whole.

The flow duct 7 between the first damper chamber 3 and the second damper chamber 4 extends, starting from the second damper chamber 4, firstly through the fan-type damping ducts 20 and 21 which at the other end lead into the collection chamber 13 or collection chambers 13. The magneto-rheological fluid collects there after exiting the damping ducts 20, 21 before passing through the flow apertures 14, 15 into the first damping chamber 3. In compressing, i.e. in the compression stage, flow passes through all of the flow apertures 14, 15. This means that the major portion of the flow presently passes through the flow apertures 15 and the one-way valves 17 automatically open at the flow apertures 15 such that the magneto-rheological fluid can pass from the second damper chamber 4 into the first damper chamber 3.

In the compressed state illustrated the first damper chamber 3 is radially entirely surrounded by the second spring chamber 27 of the spring device 26. This allows a particularly compact structure.

In the case of complete rebound of the shock absorber 100 a spring-loaded plunger 75 causes pressure compensation between the first spring chamber 26 and the second spring chamber 27.

The spring piston 37 is provided at the end of the damper housing 2. Disposed thereat is a holder 73 supporting a magnet 74. The magnet 74 is part of a sensor 47. The sensor 47 comprises a magnetic potentiometer which captures a signal that is representative of the position of the magnet 74 and thus of the spring piston. This potentiometer 47 does not only permit to determine a relative location but presently also permits to determine the absolute stage of compression or rebound of the shock absorber 100.

Figure 5:
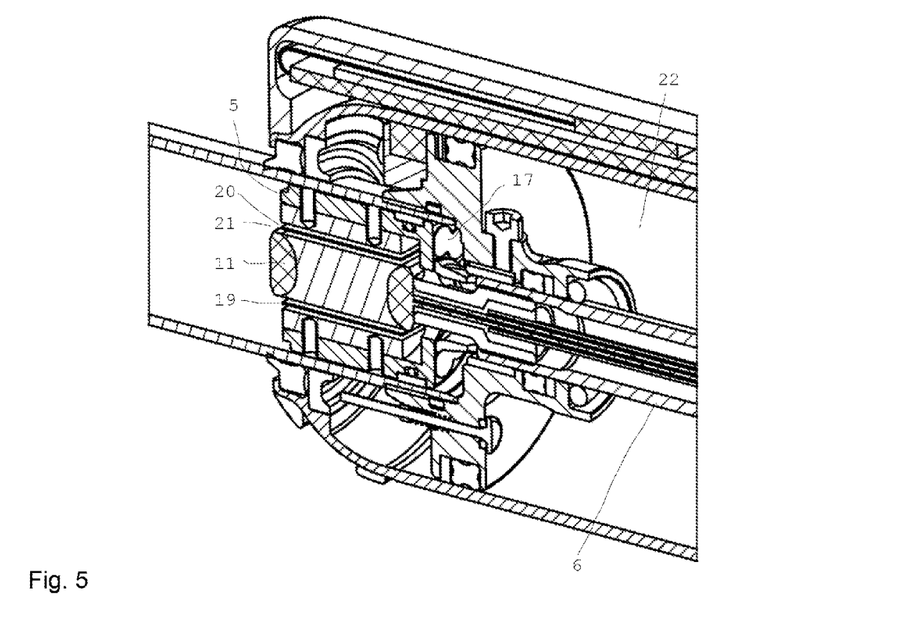
FIG. 5 an enlarged sectional illustration of the shock absorber in the rebound stage.

FIGS. 4 and 5 show partially enlarged details of the illustration according to FIG. 3, FIG. 4 illustrating the case of the compression stage and FIG. 5, the case of the rebound stage.

Figure 9:
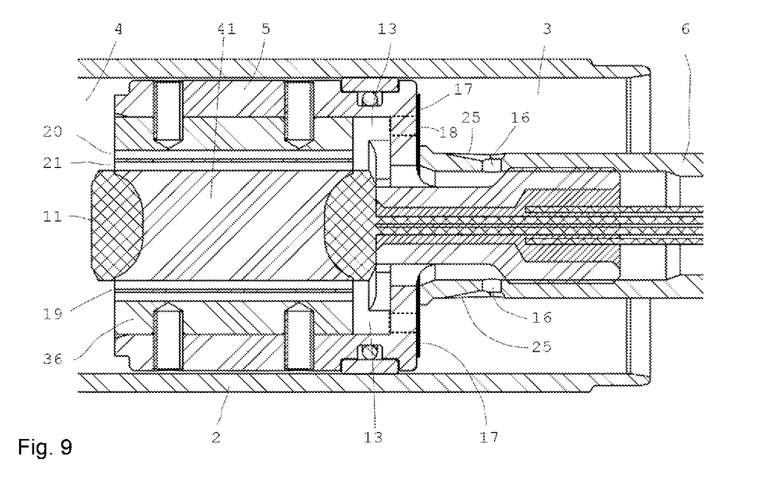
FIG. 9 an enlarged cross section of the piston unit.

In the case of the compression stage illustrated in FIG. 4, i.e. in compressing, the magneto-rheological fluid 9 emerges from the second damper chamber 4 through the damping ducts 20, 21, entering the damping piston 5. The flow resistance through the damping ducts 20, 21 depends on the magnetic field of the field generating device 11 configured as a coil. After leaving the damping ducts 20, 21 the magneto-rheological fluid collects in the two collection chambers 13 (see FIGS. 9 and 13), thereafter passing through the flow apertures 15, which are permeable in the case of the compression stage, with the one-way valves 17.

In the case of the rebound stage illustrated in FIG. 5 the magneto-rheological fluid flows from the side 22, the side of the piston rod 6, toward the damping piston 5. The one-way valves 17 at the flow apertures 15 close automatically such that only the flow apertures 14 configured for the through holes 16 in the piston rod 6 remain for putting the magneto-rheological fluid into the damping piston 5. When the magneto-rheological fluid 9 has entered through the through hole 16 in the collection chamber 13 or into the collection chambers 13, the magneto-rheological fluid evenly flows through all the fan-type damping ducts 20, 21 until the magneto-rheological fluid exits from the damping piston 5 at the other flow side 23. It can also be clearly seen in FIG. 5 that the damping piston 5 comprises a coil as the field generating device 11, a core 41 of a magnetically conducting material and a ring conductor 36. Furthermore an insulating material 42 may be provided.

The collection chamber 13 enables an efficient series connection of the one-way valves 17, which are in particular configured as shim valves, with the damping ducts 20, 21. The collection chamber 13 serves to avoid in particular inadmissibly high loads on the fan walls 19 due to different pressures in the damper ducts 20, 21. Operating pressures of 30 bars, 50 bars and more can occur which in the case of different loads on both sides of a fan wall 19 may lead to destruction of the thin fan walls 19.

Figure 6:
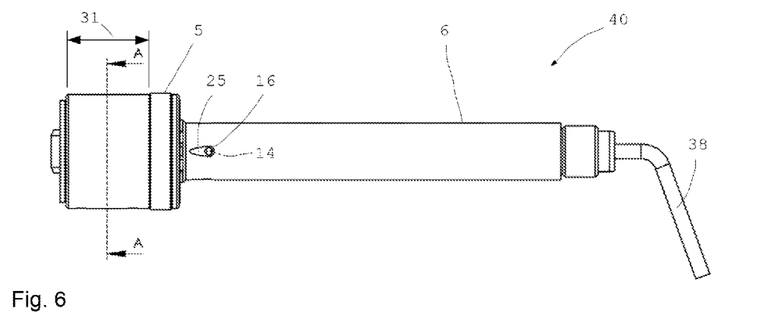
FIG. 6 the piston unit of the shock absorber according to FIG. 3.

FIG. 6 shows a side view of the damping piston unit 40 with the damping piston 5 and the piston rod 6 from the end of which the cable 38 protrudes. The length 31 of the damping ducts 20, 21 is exemplarily shown. In this illustration one can clearly see the flow aperture 14 configured as a through hole 16 with the inclined inlet 25 following, which provides for an automatically increasing end position damping. When the shock absorber 100 rebounds nearly entirely, then the spring piston 37 firstly slides across the flow aperture 16 and thereafter across the inlet 25, so as to have the flow cross-section continually decreasing and thus the damping force automatically increasing.

Figure 7:
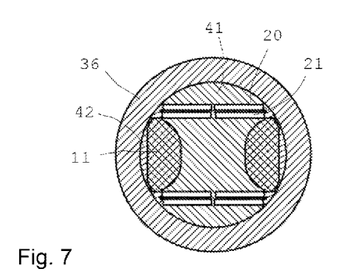
FIG. 7 the cross section A-A from FIG. 6.

FIG. 7 shows the cross-section A-A in FIG. 6. The core 41 is surrounded by the field generating device 11 configured as a coil. Damping ducts 20 and 21 are disposed in the core. The core and the coil are radially surrounded by ring conductors 36.

Figure 8:
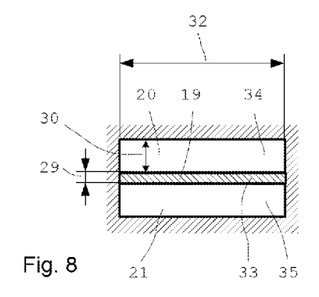
FIG. 8 a diagrammatic figure of the fan-like damping ducts.

FIG. 8 shows an enlarged illustration of the damping ducts 20, 21 provided in the core 41. The fan-type damping ducts 20, 21 are separated from one another by a fan wall 19. A wall thickness 29 of the fan wall 19 is less than a height 30 of a damping duct 20 or 21. The cross-sectional area 33 of the fan wall 19 is again considerably smaller than is the cross-sectional area 34 or 35 of the damping ducts 20 or 21. In the illustrated example the wall thickness 29 of the fan wall 19 is approximately 0.3 to 0.6 mm. The clear height 30 of the damping ducts 20 or 21 is larger, being 0.5 mm to 0.9 mm.

Values for damping ducts 20, 21 of a rear wheel damper 115 are typically, without being limited thereto, duct lengths 31 between approximately 10 and 30 mm, duct widths between approximately 5 and 20 mm, and duct heights between approximately 0.2 and 1.5 mm. Up to ten damping ducts 20, 21 may be present which may in turn be combined to form one or more groups. Within such a group the damping ducts 20, 21 are separated from one another by fan walls 19 whose wall thicknesses are typically between 0.2 and 1 mm.

The clear flow cross-section, being the sum total of all the damping ducts 20, 21, largely depends on the duct shape, the fluid employed, the piston surface, and the desired range of force. The clear flow cross-section typically lies in the range between 10 and 200 square millimeters.

Figure 10:
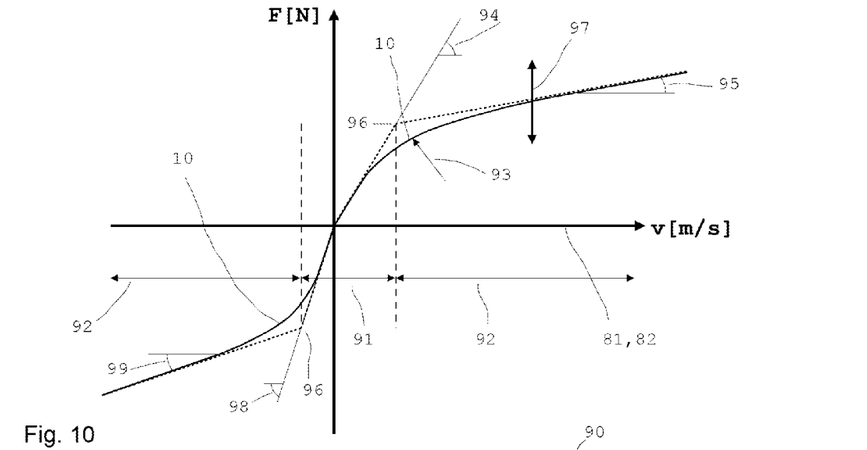
FIG. 10 a first schematic illustration of a characteristic damper curve for the shock absorber according to FIG. 3.

FIG. 10 shows a characteristic damper curve 10 of the shock absorber 100 according to FIG. 3 with the damping valve 8 in a force-speed diagram. The low-speed range 91 and the high-speed range 92 are connected with a radius 93 by way of a gentle rounding. The characteristic damper curve 10 is presently asymmetric. Although the characteristic damper curve 10 basically shows similar curve paths for the compression and rebound stages, the gradient in the rebound stage is specified to be steeper than in the compression stage.

The characteristic damper curve 10 is set electrically in real time at all times, taking into account the hydraulic basic damping, such that in each instance of a shock or event or each disturbance 85 a suitable damping force is set still during the shock 85 or the disturbance.

The gradient 94 of the characteristic damper curve 10 in low-speed range 91 can be well approximated both for the compression stage and the rebound stage, by way of a straight line showing a substantially linear gradient 94 or 98. The predetermined characteristic damper curve 10 runs through the origin of coordinates such that in the case of a relative speed of the damper piston 5 of zero, there is no damping force. This allows a very soft and agreeable responsivity.

In the high-speed range 92 the gradients 95 and 99 are presently also specified as substantially linear. A curved intermediate section 93 may extend in-between so as to avoid break points 96. Also or one linear intermediate section 93 or multiple linear or slightly curved intermediate sections 93 may be provided to approximate a curved path.

Furthermore an arrow 97 is inserted indicating the effect of a magnetic field having different strengths. Given a higher magnetic field strength the characteristic damper curve shifts upwardly while with a weaker magnetic field it shifts downwardly.

A characteristic damper curve with no intermediate section 93 provided is drawn in a dotted line so as to result in more or less noticeable break points at the points 96.

The gradients 94 and 98 in the low-speed region 91 and the gradients 95 and 99 in the high-speed regions 92 are modifiable and adaptable to the current wishes and conditions, as is the entire characteristic damper curve 10. In this way, as a different ground is recognized, a different characteristic damper curve can be selected automatically, specifying softer or else harder damping. Independently of the selected characteristic damper curve, each and every shock is dampened in real time at all times.

The gradients 95 and 99 in the respective high-speed regions 92 are again specified and can be changed as needed. The power supply for the control device and the electric coil as the field generating device 11 may also be provided by a battery, an accumulator, a generator, dynamo, or in particular a hub dynamo.

Figure 11:
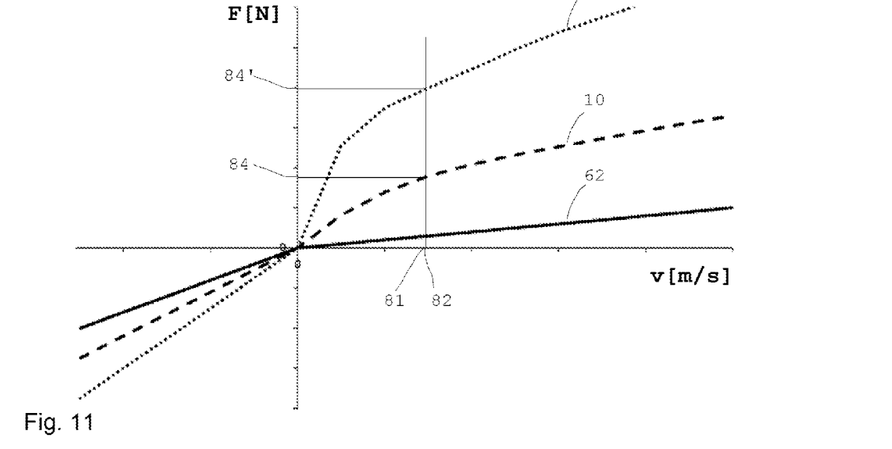
FIG. 11 a schematic illustration of the basic hydraulic curve of the shock absorber according to FIG. 3 and two different characteristic damper curves.

FIG. 11 illustrates the basic curve 62 and two different characteristic damper curves 10 and 90. It shows the damping force over the relative speed of the components 101 and 102 to one another.

The basic curve 62 represents the hydraulic properties of the shock absorber 100 where no magnetic field is applied. The gradients of the basic curve in the compression stage and in the rebound stage differ by the one-way valves 17 and in the rebound stage they are steeper than in the compression stage.

The characteristic damper curves 10 and 90 are asymmetric in FIG. 11. The characteristic damper curves 10 and 90 represent the resulting damping forces over the relative speed and they are composed of the damping force of the basic curve 62 and the magnetically generated damping force. This means that in the case of a specific compressing or rebounding speed, a damping force lower than the damping force of the basic curve 62 cannot be set. The basic curve 62 must be taken into account in designing. Weaker damping is not possible due to the principle. On the other hand, given a particularly small difference between a characteristic damper curve 10 and the basic curve 62, the electric energy required is particularly low such that a certain adaptation of the basic curve 62 to the softest characteristic damper curve provided is useful. The softest characteristic damper curve provided may e.g. be the characteristic damper curve 10.

A basic curve 62 with "useful" properties ensures reasonable emergency running properties in case that the power supply ceases to provide sufficient energy. Also possible and preferred is a mechanically adjustable emergency valve to provide adjustable emergency running properties.

The gradients in the compression stage and the rebound stage are different. In the rebound stage the gradient 96 is approximately linear on the whole. In the rebound stage there is virtually no differentiation between the low-speed region 91 and the high-speed region 92.

In the compression stage, however, the low-speed region 91 and the high-speed region 92 presently show different gradients 94 and 95 in the case of both the characteristic damper curves 10 and 90 drawn in.

The control device 46 periodically scans the sensor 47 at short, equidistant time intervals of e.g. 1 ms, 2 ms or 5 ms. The control device 46 computes from the signals a parameter 81 for the relative speed 82. It is possible for the control device to obtain from the sensor signals a relative speed 82 to be employed as the parameter 81. In the simplest of cases the sensor 47 directly obtains the associated relative speed. In another simple case the sensor 47 or the control device 46 obtains from the sensor signals a change in path or position of the components 101 and 102 relative to one another. With the time interval between two measurements known, a relative speed 82 and thus a parameter 81 can be derived therefrom. If the time interval between two measurements is substantially constant, a change in position or relative motion may be directly used as the parameter 81.

It is also possible to obtain from values from acceleration sensors or from a set of parameters of multiple different sensor values, a parameter 81 which is representative of the current relative speed 82. One embodiment provides for the data from acceleration sensors and/or displacement sensors to be coupled such that on the one hand, quick reaction is possible to fast changes due to jumps or roughness of road, and on the other hand, precise positioning and speed sensing is achieved in slower actions.

With the parameter 81 thus obtained, the pertaining damping force 84 or 84' is obtained by means of the characteristic damper curve 10 or e.g. 90 stored in a memory device. The associated magnetic field and the pertaining electric current intensity of the coil 11 are derived and adjusted in real time. This means that a cycle is completed within 20 ms and as a rule within 10 ms. Measurements may be taken more frequently, e.g. at time intervals of 5 ms or even at time intervals of 1 or 2 ms or faster still. The control device processes the sensor signals received, generating by means of the coil 11 a magnetic field of a suitable field intensity for generating the damping force pertaining to the parameter 81. The magnetic field acts within the provided cycle time of e.g. 10 ms, adjusting the desired damping force 84.

If the relative speed 82 has changed after another measuring period, a correspondingly different magnetic field is generated such that the control cycle consisting of sensor 47, control device 46 and damping valve 8 as the actor keeps the desired response time, adapting the system in real time.

Measurements have shown that in bicycle dampers, response and cycle times of 10 or 20 ms are entirely sufficient for adjusting damping in real time.

Figure 12:
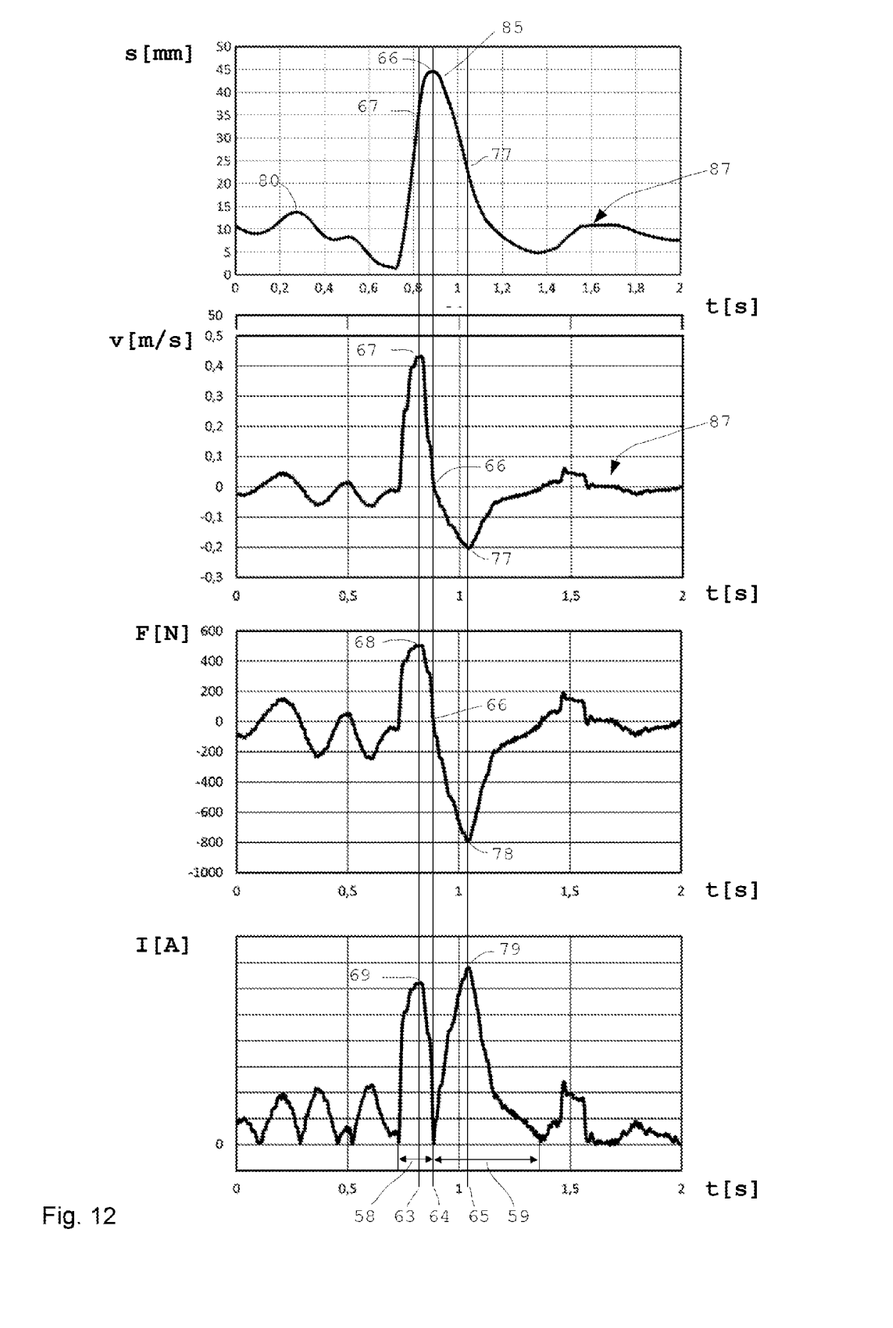
FIG. 12 the time paths of the suspension travel, the piston speed, the damping force, and the applied current intensity, for the shock absorber according to FIG. 3 during a jump.

This is also shown in the data of an actually measured and dampened jump as illustrated in FIG. 12.

FIG. 12 shows, one above the other, in a number of separate diagrams over time the measurement and control data during a jump performed with a bicycle.

The topmost diagram illustrates the suspension travel in millimeters over time in seconds with the entire time scale only showing 2 seconds. Beneath, the relative speed, the damping force, and the electric current intensity are illustrated accordingly over the same time interval.

Initially the shock absorber 100 is located inside the SAG position and is compressed about 12 mm. During the jump as the event 85 the shock absorber 100 rebounds such that the damping piston 5 is in nearly complete rebound at approximately 0.75 seconds.

After touchdown on the ground the rear wheel begins compressing, obtaining a maximum compressing and thus relative speed 67 in the compression stage which occurs at approximately 0.8 seconds and presently achieves values above 0.4 m/s. At the same time the maximum damping force 68 of presently approximately 500 N is generated at the maximum of the electric current intensity 69 in the compression stage.

A very short time later the maximum compression 66 is reached at the time 64 where the relative speed 67 reaches zero. Accordingly the control device reduces the electric current intensity to zero such that the damping force is zero.

Thereafter the rebound stage damping follows while the shock absorber 100 rebounds once again. At the same time the electric current intensity increases accordingly for adjusting a damping force which corresponds to the relative speed 67 given the characteristic damper curve set.

The maximum relative speed 77 in the rebound stage will occur at the time 65 which presently results in a maximum electric current intensity 79 for generating a maximum damping force 78 of approximately 600 N.

The duration of the jump results from the duration 58 of the compression stage of approximately 0.2 seconds and the duration 59 of the rebound stage of approximately 0.5 seconds, plus the preceding rebound phase.

It immediately follows from the times indicated that a regulating speed of 250 ms is not sufficient. In order to operate at real time, the system must respond within at least 50 ms and better within 20 ms which is presently ensured.

The regulating speed including capturing a sensor signal, deriving a parameter, adjusting the current intensity, and adjusting the damping force 84, is presently less than 10 ms. Thus the control cycle 12 or the control loop is passed through about 200 times within the time period illustrated in FIG. 12.

Figure 13:
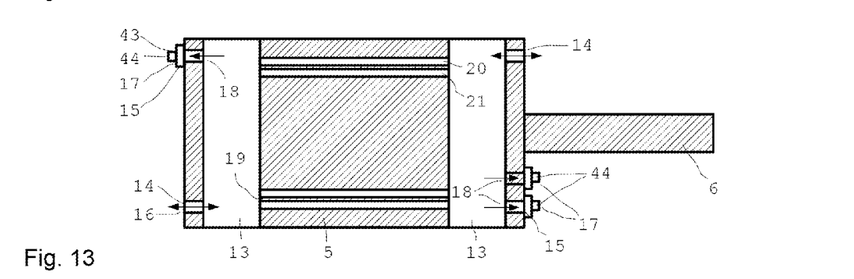
FIG. 13 another damper piston for the shock absorber according to FIG. 3.

FIG. 13 shows another damper piston 5 for the shock absorber 100 according to FIG. 3. Each of the ends of the damper piston 5 is provided with at least one collection chamber 13. This allows to provide each of the ends of the damper piston with additional flow apertures 14 as flow valves 43 provided in series with a damping duct 20. It is also possible to provide two or more damping ducts 20 and 21.

Due to providing the at least one damping duct 20 between mechanical flow apertures 14 or mechanical flow valves 43, different damping forces can be chosen in the compression and rebound stages. The flow apertures 14 may be configured partially as through holes 16 and partially as one-way valve 17. In this way different damping forces of the basic curve 62 may be specified in each flow direction independently of one another.

The flow valves 43 in particular configured as one-way valves 17 may be adjustable by means of adjusting means 44 such as screws or rotary elements for setting the flow resistance in relation to the direction. For example each of the ends may be provided with a rotary ring as the adjusting means 44 which, in relation to the angle of rotation, closes part or all of one, two, or more of the flow apertures provided over the circumference such that the maximum flow cross-sections available in one or the other of the flow directions 22 or 23 can be set accordingly.

In this way the basic curve 62 of the shock absorber 100 can be adapted as desired both in the rebound stage and in the compression stage. For example an adaptation of the basic curve 62 of the shock absorber 100 to the type of frame may be provided. Depending on the frame geometry and the frame size and the mounting position, preadjustment may be done so as to provide for basic adaptation of the basic curve 62 to the installation conditions.

The basic curve 62 is then preferably set to the mounting situation provided such that it corresponds approximately to the characteristic damper curve 10 having the softest damping provided. If only soft damping is desired or set, then no electric energy at all will be required. The electric coil must be energized only at those times when stronger damping is required. This measure allows to once again considerably reduce electric current consumption.

In all the operating modes of the shock absorber 100 at least one displacement sensor is employed preferably as the sensor device 47. The sensor device 47 is preferably read e.g. at a frequency of 2 kHz and a resolution of 12 bits. In theory, given a stroke of a rear wheel damper 115 of 50 mm once in every 0.5 ms, the relative motion can be determined at an accuracy of 12 μm. Unlike thereto, a suspension fork 114 shows a stroke of e.g. 150 mm, such that under the same conditions a relative motion can be determined at an accuracy of 36 μm.

The data captured by means of the sensor device 47 preferably pass through a low-pass filter and are used for computing the speed wherein a specific damping force is computed by way of the current speed, direction, and the preset characteristic damper curve. This computing operation is repeated e.g. at 500 Hz such that a new force specification is generated once in every 2 ms. An electric current to be set is obtained from the damping force based on the known conjunction of damping force and field intensity required therefor and in turn the electric current intensity required therefor. In particular a dedicated electric current regulator sets the respective electric current at the electric coil device at the shock absorber by way of this specified force such that the resulting damping force is traced sufficiently fast and substantially corresponds to the specification.

The conversion to a digital signal of a relative motion measured by analog meter and the subsequent computing of the specified electric current or the electric current to be set requires hardly any resources, and using a state-of-the-art microcontroller it can be done in a matter of mere microseconds. The electric current regulator provides adequately fast response of the electric coil device such that, notwithstanding inductivity and eddy currents, an electric current jump from 0 to 100% is possible in very few milliseconds.

What is advantageous for the responsivity of the electric current regulator is, the low-pass filter and computation of the relative speed where presently a compromise must be found between fast response and filter effect. The filter parameters may be dynamically adapted to the prevailing situation.

Given fast filtering, a relative motion or change in position will in the worst case scenario be recognized in the subsequent regulating pulse after 2 ms and will then be processed within a few microseconds. The electric current regulator will virtually instantly work toward implementing the new specification of electric current. The damping force acts at some delay following the specification of electric current. The response time of the magneto-rheological fluid (MRF) is less than 1 ms. The rigidity of the system is again of minor importance. Depending on the concrete structure the new nominal value of the damping force is obtained within a few milliseconds. Jump response times of less than 10 ms are readily feasible with the system and have been verified successfully in the past. Depending on the requirements and available manufacturing costs, faster components may be employed which allow jump response times in the region of one-digit milliseconds.

Regulation may also be based on fuzzy logic and/or learning.

Two or more dampers may be linked electrically to form one system. In this case e.g. relevant data are transmitted from a first damper to a second damper in real time such that it can better adapt to the event. For example the damper in the suspension fork can transmit the information to the rear wheel damper such that the latter can anticipate e.g. a severe shock. The entire system will thus be more efficient. Also/or a hydraulic link of two or more dampers is possible (open or closed hydraulic system).

The damper device may comprise two or more controllable damping valves having one (or multiple) field generating device(s). These may be attached external of the components movable relative to one another. It is also possible to provide at least one permanent magnet which generates a static magnetic field. The strength of the magnetic field effectively acting in the damping valve can then be modulated in real time by the magnetic field generated by the electric coil as the field generating device.

On the whole the invention provides an advantageous shock absorber which can be applied both as a rear wheel shock absorber and in a suspension fork. Different basic damping in the compression and/or rebound stages is enabled in a simple way. The difference depends on the orientation of the one-way valves in the flow apertures. In this way a flexible and comprehensive adaptation to many different requirements can be ensured. Controlling takes place in real time so as to provide prompt and immediate response to all the occurring events, disturbances, shocks or obstacles.

LIST OF REFERENCE NUMERALS 1 damper device
2 damper housing
3 first damper chamber
4 second damper chamber
5 damping piston
6 piston rod
7 flow duct
8 damping valve
9 field-sensitive medium
10 characteristic damper curve
11 field generating device, coil
12 control cycle
13 collection chamber
14 flow aperture
15 flow aperture
16 through hole
17 one-way valve
18 valve opening
19 fan wall
20 damping duct
21 damping duct
22 one flow side
23 other flow side
24 flow direction
25 inlet
26 spring device
27 first spring chamber
28 second spring chamber
29 wall thickness
30 clear extension
31 length
32 width
33 cross-sectional area
34 cross-sectional area
35 cross-sectional area
36 ring conductor
37 spring piston
38 cable
39 end position
40 damping piston unit
41 core
42 insulating material
43 flow valve
44 adjusting means
45 memory device
46 control device
47 sensor
48 operating device 49 display
50 electronic unit
51 control knob
52 step
53 internet
54 network interface
55 radio network interface
56 step
57 graphical operating unit
58 duration compression stage
59 duration rebound stage
60 control device
61 battery unit
62 basic curve
63 time
64 time
65 time
66 max. compression
67 max. relative speed
68 max. damping force
69 max. electric current intensity
70 step
71 equalizing space
72 equalizing piston
73 holder
74 magnet
75 plunger
77 max. relative speed
78 max. damping force
79 max. electric current intensity
80 relative motion
81 parameter
82 relative speed
83 field intensity to be set
84 damping force
85 event
86 relative position
87 time interval
90 characteristic damper curve
91 low-speed range
92 high-speed range
93 transition region
94 gradient
95 gradient
96 break point
97 arrow
98 gradient
99 gradient
100 shock absorber
101 component first end
102 component second end
111 front wheel
112 rear wheel
113 frame
114 suspension fork
115 rear wheel damper
116 handlebar
117 saddle
200 bicycle

The invention claimed is:

1. A shock absorber for bicycle, the shock absorber comprising:
    at least one damper device for damping a relative motion between a first component and a second component, said damper device having at least one controllable damping valve with at least one field generating device configured to influence a field-sensitive medium for influencing a damping force of said damper device by generating a field intensity of the field generating device;
    a control device and at least one sensor device configured to periodically acquire, in real time, at least one parameter for relative speeds between the first and second components relative to one another for event recognition;
    said control device being configured for deriving, in real time, a field intensity to be currently set by way of the parameter from a characteristic damper curve stored in a memory device;
    said control device and said field generating device being configured to set the field intensity to be currently set in real time for setting in real time a damping force resulting from the predetermined characteristic damper curve at the parameter; and
    said damper device having a basic curve defined by mechanical valves, with a damping force gradient being steeper with negative relative speeds than the damping force gradient with positive relative speeds.

2. The shock absorber according to claim 1, wherein at least one of said mechanical valves is a mechanical one-way valve.

3. The shock absorber according to claim 1, wherein at least two of said valves are mutually different mechanical valves connected in parallel.

4. The shock absorber according to claim 1, wherein at least one mechanical valve and at least one damping duct are connected in series, and said field generating device is disposed to subject the field-sensitive medium in said at least one damping duct to the field.

5. The shock absorber according to claim 1, wherein said damping device is configured to have a maximum flow cross-section in a compression stage that is different from a maximum flow cross-section in a rebound stage.

6. The shock absorber according to claim 5, which comprises at least one mechanical one-way valve disposed to define the difference between the maximum flow cross-section in the compression and rebound stages.

7. The shock absorber according to claim 1, wherein said field generating device is current-less in an absence of an event and requires electric energy for damping only as an event occurs.

* * * * *